US008593975B2

United States Patent
El-Hennawey et al.

(10) Patent No.: US 8,593,975 B2
(45) Date of Patent: *Nov. 26, 2013

(54) NON-INTRUSIVE MONITORING OF QUALITY LEVELS FOR VOICE COMMUNICATIONS OVER A PACKET-BASED NETWORK

(75) Inventors: Mohamed S. El-Hennawey, Belleville (CA); Ick Don Lee, Belleville (CA)

(73) Assignee: Rockstar Consortium US LP, Plano, TX (US)

( * ) Notice: Subject to any disclaimer, the term of this patent is extended or adjusted under 35 U.S.C. 154(b) by 468 days.

This patent is subject to a terminal disclaimer.

(21) Appl. No.: 12/782,468

(22) Filed: May 18, 2010

(65) Prior Publication Data

US 2010/0232314 A1    Sep. 16, 2010

Related U.S. Application Data

(63) Continuation of application No. 10/267,765, filed on Oct. 9, 2002, now Pat. No. 7,746,797.

(51) Int. Cl.
    *G01R 31/08*    (2006.01)
(52) U.S. Cl.
    USPC ........... 370/250; 370/252; 370/352; 379/1.01
(58) Field of Classification Search
    None
    See application file for complete search history.

(56) References Cited

U.S. PATENT DOCUMENTS

| | | | |
|---|---|---|---|
| 3,725,612 A | 4/1973 | Campanella et al. | |
| 4,672,669 A | 6/1987 | DesBlache et al. | |
| 5,283,571 A | 2/1994 | Yang et al. | |
| 5,410,632 A | 4/1995 | Hong et al. | |
| 5,812,965 A | 9/1998 | Massaloux | |
| 5,835,889 A | 11/1998 | Kapanen | |
| 5,867,495 A | 2/1999 | Elliott et al. | |
| 5,978,761 A | 11/1999 | Johansson | |
| 5,978,763 A | 11/1999 | Bridges | |
| 6,044,342 A | 3/2000 | Sato et al. | |
| 6,542,499 B1 * | 4/2003 | Murphy et al. | ............... 370/352 |
| 6,577,996 B1 | 6/2003 | Jagadeesan | |
| 6,775,240 B1 | 8/2004 | Zhang et al. | |
| 6,801,939 B1 | 10/2004 | Chafe | |
| 6,819,924 B1 | 11/2004 | Ma et al. | |

(Continued)

OTHER PUBLICATIONS

International Telecommunications Union, Serial G.729; Transmission Systems and Media; Annex B: A Silence compression scheme for G.729 optimized for terminals conforming to Recommendation V.70, Nov. 1996, pp. 1-16.

(Continued)

*Primary Examiner* — Chi Pham
*Assistant Examiner* — Shick Hom

(57) ABSTRACT

Provided is a method and apparatus for objectively and non-intrusively measuring voice quality on live calls without disrupting the call session or the network. A communication system includes plural communities each including a switch that controls access to a packet-based data network for call sessions. Each of the communities is coupled to the data network by respective packet-based trunks. Quality of service (QoS) monitoring devices are coupled to the respective packet-based trunks to monitor quality levels of routes between any two given communities. Each QoS monitoring device receives packets containing streaming data (which may be actual packets or test packets). From the received packets, the QoS monitoring device can derive QoS parameters, particularly for audio and speech signals on live calls without disrupting the call session.

19 Claims, 6 Drawing Sheets

(56) References Cited

U.S. PATENT DOCUMENTS

| | | | |
|---|---|---|---|
| 6,891,881 B2 | 5/2005 | Trachewsky et al. | |
| 6,931,022 B1 | 8/2005 | Sanders et al. | |
| 7,746,797 B2* | 6/2010 | El-Hennawey et al. | 370/250 |
| 2001/0055276 A1 | 12/2001 | Rogers et al. | |
| 2002/0071424 A1 | 6/2002 | Chiu et al. | |
| 2002/0147828 A1 | 10/2002 | Chen et al. | |
| 2002/0191798 A1* | 12/2002 | Juric et al. | 381/56 |
| 2002/0193999 A1* | 12/2002 | Keane et al. | 704/270 |
| 2004/0022367 A1* | 2/2004 | Talalai | 379/10.01 |
| 2006/0239271 A1 | 10/2006 | Khasnabish et al. | |
| 2007/0223455 A1 | 9/2007 | Chang et al. | |

OTHER PUBLICATIONS

International Telecommunications Union, Serial G.723.1: Transmission Systems and Media; Annex A: Silence compression scheme; Nov. 1996, pp. 1-15.

European Telecommunication Standard; ETS300 973, May 1997, Digital cellular telecommunications systems; Half-rate speech; Voice Activity Detector (VAD) for half rate speech channels (GSM 06.42 version 5.0.1), pp. 1-21.

European Telecommunication Standard; ETS 300 971, May 1997, Digital cellular telecommunications system; Half rate speech; Comfort noise aspects for the half rate speech traffic channels, (GSM 06.22 version 5.0.1); pp. 1-14.

Seishi Sasaki, et al., "Voice Activity Detection and Transmission Error Control for Digital Cordless Telephone System"; IEICE Trans. Communication, vol. E77-B, No. 7; Jul. 1994; pp. 948-955.

D.K. Freeman, et al., "The Voice Activity Detector for the Pan-European Digital Cellular Mobile Telephone Service"; Proceedings of the IEEE Int. Conf. on Acoustics, Speech and Signal Processing, 1989; pp. 369-372.

European Technical Standard; ETS 300 965, Apr. 1998, Digital cellular telecommunications system (Phase 2+) Full rate speech; Voice Activity Detector (VAD) for full rate speech traffic channels (GSM 06.32 version 5.0.31. pp. 5-37.

Adil Benyassine, et al.; ITU-T Recommendation G.729 Annex B: A Silence Compression Scheme for Use with G.729 Optimized for V.70 Digital Simultaneous Voice and Data Applications; IEEE Communications Magazine, Sep. 1997; pp. 64-73.

Office Action dated Dec. 5, 2000 as issued in U.S. Appl. No. 09/218,009.

Office Action dated Mar. 26, 2001 as issued in U.S. Appl. No. 09/218,009.

Office Action dated Oct. 11, 2001 as issued in U.S. Appl. No. 09/218,009.

* cited by examiner

NON-INTRUSIVE MONITORING OF QUALITY LEVELS FOR VOICE COMMUNICATIONS OVER A PACKET-BASED NETWORK

This application is a continuation of prior application Ser. No. 10/267,765 filed on Oct. 9, 2002, now U.S. Pat. No. 7,746,797 which is incorporated herein by reference.

BACKGROUND

The invention relates to monitoring voice quality levels in substantially real time for communications over a packet-based data network.

Data networks are widely used to link various types of network elements, such as personal computers, servers, gateways, network telephones, and so forth. Data networks may include private networks (such as local area networks or wide area networks), and public networks (such as the Internet). Popular forms of communications between network elements across such data networks include electronic mail, file transfer, web browsing, and other exchanges of digital data.

With the increased capacity and reliability of data networks, voice communications and other forms of streaming communications over data networks have become possible. Voice communications over data networks are unlike voice communications in a conventional circuit-switched network, such as the Public Switched Telephone Network (PSTN), which provides users with dedicated, end-to-end circuit connections for the duration of each call. Communications over data networks, such as IP (Internet Protocol) networks, are performed using packets or datagrams that are sent in bursts from a source to one or more destination nodes. Voice data, and other forms of streaming data, sent over a data network typically share network bandwidth with conventional non-streaming data (e.g., data associated with electronic mail, file transfer, web access, and other traffic).

In a packet-based data network, each data packet is routed to a node having a destination address contained within the header of the packet. Data packets may be routed over separate network paths before arriving at the final destination for reassembly. Transmission speeds of the various packets may vary widely depending on the usage of data networks over which the data packets are transferred. During peak usage of data networks, delays added to the transfer of voice data packets may cause poor performance of voice communications. Voice data packets that are lost or delayed due to inadequate or unavailable capacity of data networks or resources of data networks may result in gaps, silence, and clipping of audio at the receiving end.

A need thus exists for a method and apparatus that monitors for real time voice quality levels in live calls in packet-based data networks.

SUMMARY

In general, according to one embodiment, a method of determining a quality level of a packet-based network includes receiving, in a monitoring device communicatively coupled to data network, packets containing streaming data. One or more quality of service parameters associated with the received packets are derived. The derived one or more quality of service parameters are communicated to control operation of a switch.

Some embodiments of the invention may include one or more of the following advantages. The quality level for communications involving streaming data, such as voice and/or video, may be improved. For example, based on a monitored quality level of a data network, a switch may re-route calls over other paths away from a congested data network. Alternatively, and after measuring the voice quality, some other network parameters can be altered and tuned to accommodate the present network conditions to achieve best quality possible. Among such parameters are: the codec choice, packet size, transmission speed, the use of VAD (Voice Activity Detector), etc.

Provided is a method of evaluating voice quality on an active call by sending test packets over a connection between the call parties in a non-intrusive manner. This may improve the performance of the calls and may also help alleviate congestion of the data network so that the data network may recover. Recovery of the data network leads to enhanced service to users of the data network for both streaming and non-streaming data communications.

Other features and advantages will become apparent from the following description, from the drawings, and from the claims.

DETAILED DESCRIPTION

In the following description, numerous details are set forth to provide an understanding of the present invention. However, it will be understood by those skilled in the art that the present invention may be practiced without these details and that numerous variations or modifications from the described embodiments may be possible.

Figure 1:
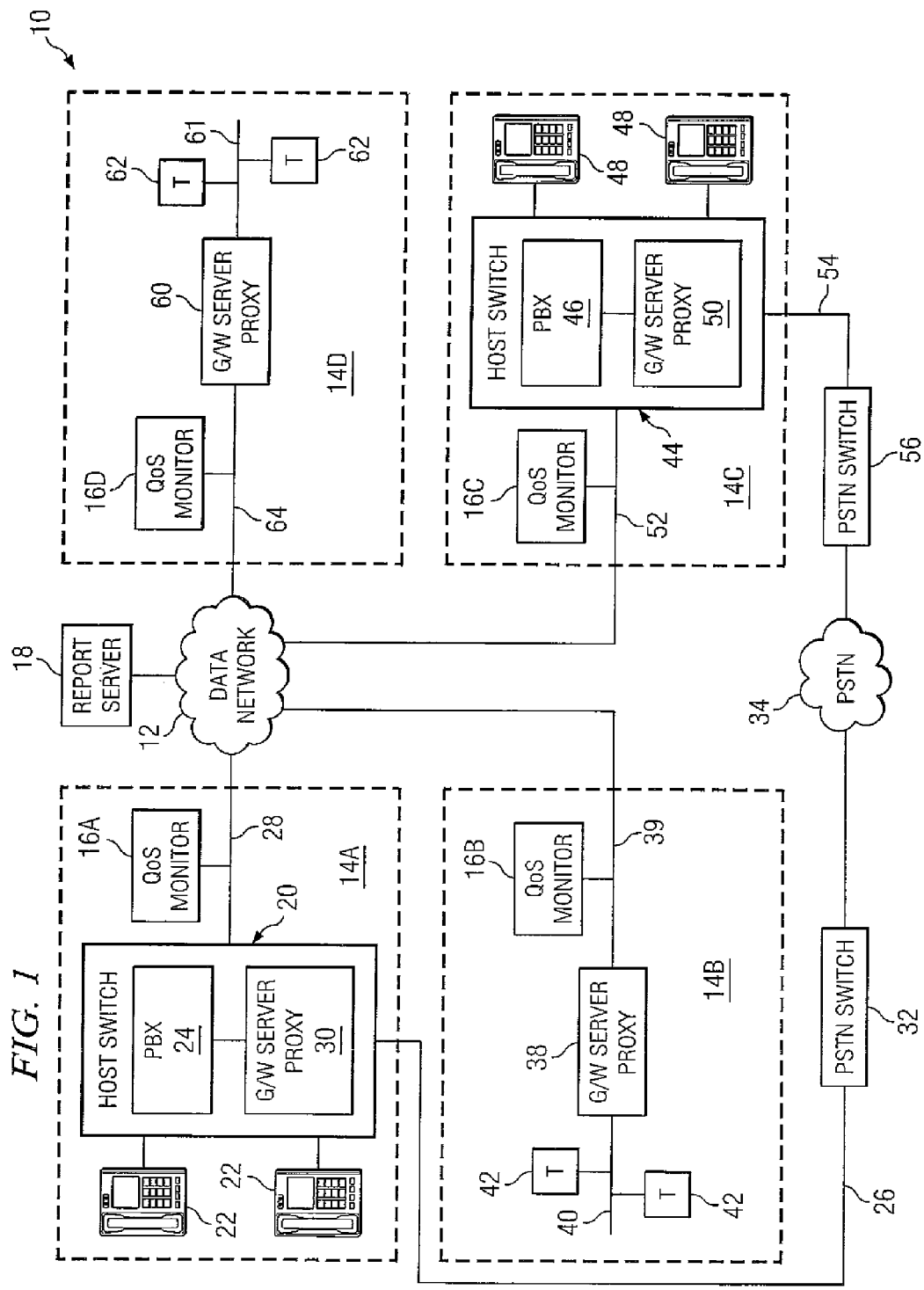
FIG. 1 is a block diagram of an embodiment of a communications system that includes a packet-based data network.

Referring to FIG. 1, a communications system 10 includes a packet-based data network 12 that may be coupled to various communities 14A, 14B, 14C, and 14D. As used here, a "community" refers to a localized group of terminals that are capable of participating in call sessions, either locally within the community 14 or with another terminal over the data network 12. As used here, a "data network" or "network" may refer to one or more communications networks, channels, links, or paths and systems or devices (such as routers or switches) used to route data over such networks, channels, links, or paths. A "call session" refers generally to either an audio (e.g., voice) or a multimedia (e.g., voice and video) session established between two or more network elements (and parties using those elements) coupled to the data network 12 (or any other packet-based data network). The data network 12 may be a public network (such as the Internet), a private network such as a wide area network (WAN), or a combination of private and public networks As shown in FIG. 1, each of the communities 14A, 14B, 14C, and 14D includes a quality of service (QoS) monitoring device 16A, 16B, 16C, and 16D. The QoS monitoring devices are capable of monitoring packets communicated over the data network 12 and deriving various QoS parameters to determine the voice quality levels of routes in the data network 12. The QoS monitoring devices 16 may monitor actual streaming packets communicated between two user terminals, or alternatively, each of the QoS monitoring devices are capable of generating test packets including simulated streaming data amid the actual streaming packets (e.g., audio and/or video data) that are communicated over the data network 12 to another QoS monitoring device 16. For example, the QoS monitoring device 16A in the community 14A can generate test packets for transmission to each of the remote QoS monitoring devices 16B, 16C, and 16D to determine the quality of routes between the respective communities. Thus, monitoring of actual packets containing streaming data or exchanges of test packets between remote QoS monitoring devices 16 provide the ability to measure the voice quality level of routes between corresponding communities 14.

In an alternative embodiment, the media gateway 30 may perform the function of sending the reference signal during parts of silence within the live call. Local reports on voice quality may then be relayed to the Q0S monitors 16A, 16B, 16C and 16D, which may then relay them to the report server 18 for global network assessment.

In operation, the QoS monitoring device in one community (e.g. community A) may detect inactivity (i.e., silence in the media payload) in the streaming packets, and transmit control signaling indicating that test packets may be sent, followed by transmitting reference test packets over the network, to be received by a QoS monitoring device in another community (e.g. community B). The reference test packets may comprise a predetermined sound sample from a WAV file. The contents are retrieved from the received reference test packets and then are processed by the QoS monitoring device in community B by using a speech clarity testing method which compares the received sound sample from the reference test packets with a predetermined uncorrupted sample (e.g., a WAV file, or the like, employing a standard format for recorded sound) that is stored at community B. Examples of such speech clarity testing methods include PAMS (Perceptual Analysis Measurement Systems), or the standards defining PSQM (Perceptual Speech Quality Measurement), PSQM+(Perceptual Speech Quality Measurement Plus), PESQ (Perceptual Evaluation of Speech Quality), and similar schemes. These standards are hereby incorporated by reference. These automated speech clarity testing methods may be implemented in software or hardware to measure perceptual voice clarity. If activity is detected on the media input, e.g. voice or video is to be transmitted, then control signaling transmits a signal to discontinue transmission of the reference test packets and to adapt the channel back to carrying the streaming-media communications. This allows monitoring the quality of actual streaming-media transmitted over a data network to be performed in real time without affecting the actual media transmission. More detail of the algorithm for the QoS monitoring device is provided in FIGS. 5-7.

In order not to overload the network with sending reference test packets, the transmission of such signals may be made upon demand and in a frequency that is low enough not to congest the network and at the same time high enough to tract network variations with time. The choice of the frequency by which the reference signal is sent depends on many network related factors and needs, and therefore it may be handled by the network management system in a dynamic way.

Figure 2:
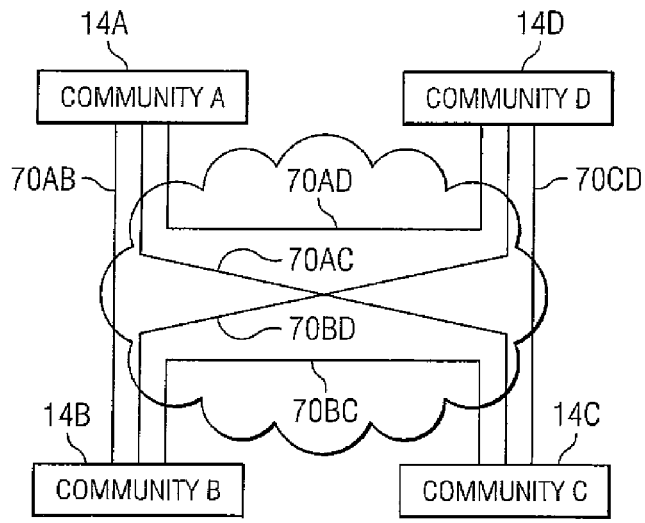
FIG. 2 illustrates routes through the data network between communities in the communications system of FIG. 1.

Referring further to FIG. 2, representations of routes through the data network 12 between communities 14A, 14B, 14C, and 14D are illustrated. The routes in the illustrated embodiment include route 70AB (between communities 14A and 14B), route 70AC (between communities 14A and 14C), route 70AD (between communities 14A and 14D), route 70BC (between communities 14B and 14C), route 70BD (between communities 14B and 14D), and route 70CD (between communities 14C and 14D). Each route 70 may include a collection of one or more physical paths (formed of wires, Cables, routers, and so forth). Packets communicated over a route 70 may actually take two or more different paths.

Once a QoS monitoring device 16 has derived QoS parameters for a particular route, such QoS parameters are reported to a report server 18 coupled to the data network 12. Based on the reported QoS parameters, the report server 18 can determine if the quality level of the route has fallen below an acceptable threshold. If so, the report server 18 sends an indication to affected switches in the communities 14 to indicate that certain routes in the data network 12 are unavailable to provide acceptable quality of service.

As used here, a "switch" refers generally to any type of system or device that provides a point at which end stations or terminals can access the network. In circuit-switched networks, a switch may be a switching or exchange system. In packet-based networks, a switch may be gateways, routers, and so forth. A first type of link includes a route between two switches, which may be referred to as a "trunk." Another type of link may be referred to as a "line," which may include a circuit or path that connects an end station or terminal to a switch. Examples of end stations or terminals include telephones, data terminals, computers, and other like devices.

In the community 14A of FIG. 1, a host switch 20 is coupled to several end stations 22, which in one example may be standard telephones 22 (analog or digital). The telephones 22 may be connected to a telephone exchange system 24 that is part of the host switch 20. The telephone exchange system 24 may include a private branch exchange (PBX) system, a key telephone system, or some other type of telephone exchange system. The telephone exchange system 24 receives stimulus signals (e.g., on/off hook events, digit dial events, and so forth) from the stimulus telephones 22. Such stimulus signals are converted to call control signaling that can be communicated either over a circuit-switched trunk 26 or through a gateway, server, or proxy 30 to a packet-based trunk 28. The gateway, server, or proxy 30 converts circuit-switched call control signaling (communicated from or to the telephone exchange system 24) to packet-based call control signaling (communicated from or to the packet-based trunk 28), and vice versa. Alternatively, the telephone exchange system 20 may be capable of generating packet-based call control signaling for communication directly over the packet-based trunk 28.

The circuit-switched trunk 26 may be coupled to a public switched telephone network (PSTN) switch 32, which may be located at a central switching office, for example. The PSTN switch 32 is capable of routing calls over a PSTN 34. The trunk 26 may be an Integrated Services Digital Network (ISDN) link. An ISDN link is an end-to-end digital connection that provides digital channels for telephony communications. Two types of ISDN links exist: basic rate interface (BRI) and primary rate interface (PRI). BRI, sometimes refers to as 2B+D, provides two 64-kbps (kilobits per second) B channels for data and a 16-kbps D channel for control. PRI, sometimes referred to as 23B+D, provides 23 B channels and a 64-kbps D channel. In alternative embodiments, the link 26 may be another type of link, such as a Signaling System No. 7 (SS7) link or another type of link. SS7 signaling allows call control signaling (e.g., control signaling associated with call setup, call management, and call tear down) to be exchanged between switches.

The packet-based trunk 28 couples the host switch 20 to the data network 12. The QoS monitoring device 16A is connected to the packet-based trunk 28. Thus, as illustrated in FIG. 1, two types of call sessions may be possible in the communications system 10. A first type includes circuit-switched call sessions over the PSTN 34, while a second type includes packet-based communications over the data network 12.

One type of packet-based data network includes a packet-switched network such as an Internet Protocol (IP) network. IP is described in Request for Comments (RFC) 791, entitled "Internet Protocol," dated September 1981. Other versions of IP, such as IPv6, or other connectionless, packet-switched standards may also be utilized in further embodiments. A version of IPv6 is described in RFC 2460, entitled "Internet Protocol, Version 6 (IPv6) Specification," dated December 1998. A packet-switched data network communicates with packets, datagrams or other units of data over the data networks. Unlike circuit-switched networks, which provide a dedicated end-to-end connection or physical path for the duration of a call session, a packet-switched network is one in which the same path may be shared by several network elements.

Packet-switched networks such as IP networks are based on a connectionless internetwork layer. Packets or other units of data injected into a packet-switched data network may travel independently over any path (and possibly over different paths) to a destination point. The packets may even arrive out of order. Routing of the packets is based on one or more addresses carried in each packet.

The packet-based data network 12 may also include a connection-oriented network, such as an ATM (Asynchronous Transfer Mode) network or Frame Relay network. In a connection-oriented, packet-based network, a virtual circuit or connection is established between two end points. In such connection-oriented networks, packets are received in the same order in which they were transmitted.

Different protocols exist that define packet-based call control signaling for call sessions over packet-based data networks. One example call control protocol is a Session Initiation Protocol (SIP), which is used to initiate call sessions as well as to invite members to a session that may have been advertised by some other mechanism, such as electronic mail, news groups, web pages, and other mechanisms. SIP is part of the multimedia data and control architecture from the Internet Engineering Task Force (IETF). A version of SIP is described RFC 2543, entitled "SIP: Session Initiation Protocol," dated in 1999. The other protocols in the IETF multimedia and control architecture include the Resource Reservation Protocol (RSVP), as described in RFC 2205, for reserving network resources; the Real-Time Transport Protocol (RTP), as described in RFC 1889, for transporting real-time data and providing quality of service (QoS) feedback; the Real-Time Streaming Protocol (RTSP), as described in RFC 2326, for controlling delivery of streaming media; the Session Description Protocol (SDP), as described in RFC 2327, for describing multimedia sessions; and the Session Announcement Protocol (SAP) for advertising multimedia sessions by multicast.

Other standards may be employed in further embodiments for controlling communications sessions over the data network 12. One such other standard includes the H.323 Recommendation from the International Telecommunication Union (ITU). Standards defined by the ITU-T may be utilized to establish the call set-up. During the call, other standards may be used for objectively assessing the quality of speech that has been degraded by a telephony network. Such standards may include PAMS (Perceptual Analysis Measurement Systems), or the ITU-T standards defining PSQM (Perceptual Speech Quality Measurement), PSQM+ (Perceptual Speech Quality Measurement Plus), PESQ (Perceptual Evaluation of Speech Quality). PSQM and PSQM+ have a high correlation to subjective quality across a broad range of types of distortion, and are appropriate for testing networks that are subject to different coding types and transmission errors. PSQM and PSQM+ are used primarily to test networks that have speech compression, digital speech interpolation, and packetization. Networks that carry voice over IP (VoIP), voice over frame relay (VoFR), and voice over ATM (VoATM) have these characteristics.

A known testing tool, Abacus™ marketed by Zarak Systems Corporation (based in Silicon Valley, USA), for testing packetized speech networks derives a PSQM score for a conversation passing through a network. This known tool passes speech from a WAV file, and divides the file into multiple 32 ms speech frames. This tool takes 256 samples from every speech frame, with the frames overlapping by 128 samples. The number of speech frames varies with the size of the WAV file. A PSQM score is calculated for each frame, and an average PSQM score is reported for all speech frames within the conversation. However, this known testing tool sets up a separate call session for the test in an intrusive manner (i.e. no live calls can be made on that particular link under test). It does not teach or suggest testing a preexisting call session that is already set up to carry live media (e.g., voice/video) communications. Such live media communications includes a voice and/or a video conversation in a non-intrusive approach. It also fails to teach or suggest using periods of silence to insert reference voice signals for voice quality measurement.

As further shown in FIG. 1, the other communities 14B, 14C, and 14D may have arrangements of elements that are similar to or different from the arrangement of the community 14A. In the community 14B, the switch includes a gateway, server, or proxy 38 between a local network 40 and the data network 12. A packet-based trunk 39 couples the gateway, server, or proxy 38 to the data network 12. The gateway, server, or proxy 38 may include a firewall that prevents unauthorized access of the local network 40. Various user terminals may be coupled to the local network 40, which may be IP-based. The user terminals 42 may include computers that include audio and/or video processing elements or network telephones. The user terminals 42 coupled to the local network 40 are capable of establishing call sessions in the community 14B with each other. The user terminals 42 are also capable of establishing a call session with a remote element through the gateway, server, or proxy 38 and the data network 12.

The community 14C may be similarly arranged as the community 14A. The community 14C includes a host switch 44 that includes a telephone exchange system 46 coupled to telephones 48. The telephone exchange system 46 is connected to a gateway, server, or proxy 50 that is capable of participating in call sessions over a packet-based trunk 52. The QoS monitoring device 16C in the community 14C may be connected to the packet-based trunk 52.

The telephone exchange system 46 in the host switch 44 may also be capable of establishing a call session over a circuit-switched trunk 54 to a PSTN switch 56. The PSTN switch 56 is coupled to the PSTN 34.

The community 14D includes a switch 60 that may be in the form of a gateway, server, or proxy that is coupled to a local network 61. The local network 61 is coupled to various user terminals 62, such as computers or network telephones. The switch 60 is coupled by a packet-based trunk 64 to the data network 12. The QoS monitoring device 16D in the community 14D is connected to the packet-based trunk 64. Communities 14A, 14B, 14C and 14D may be duplicated as needed within the network.

Figure 3:
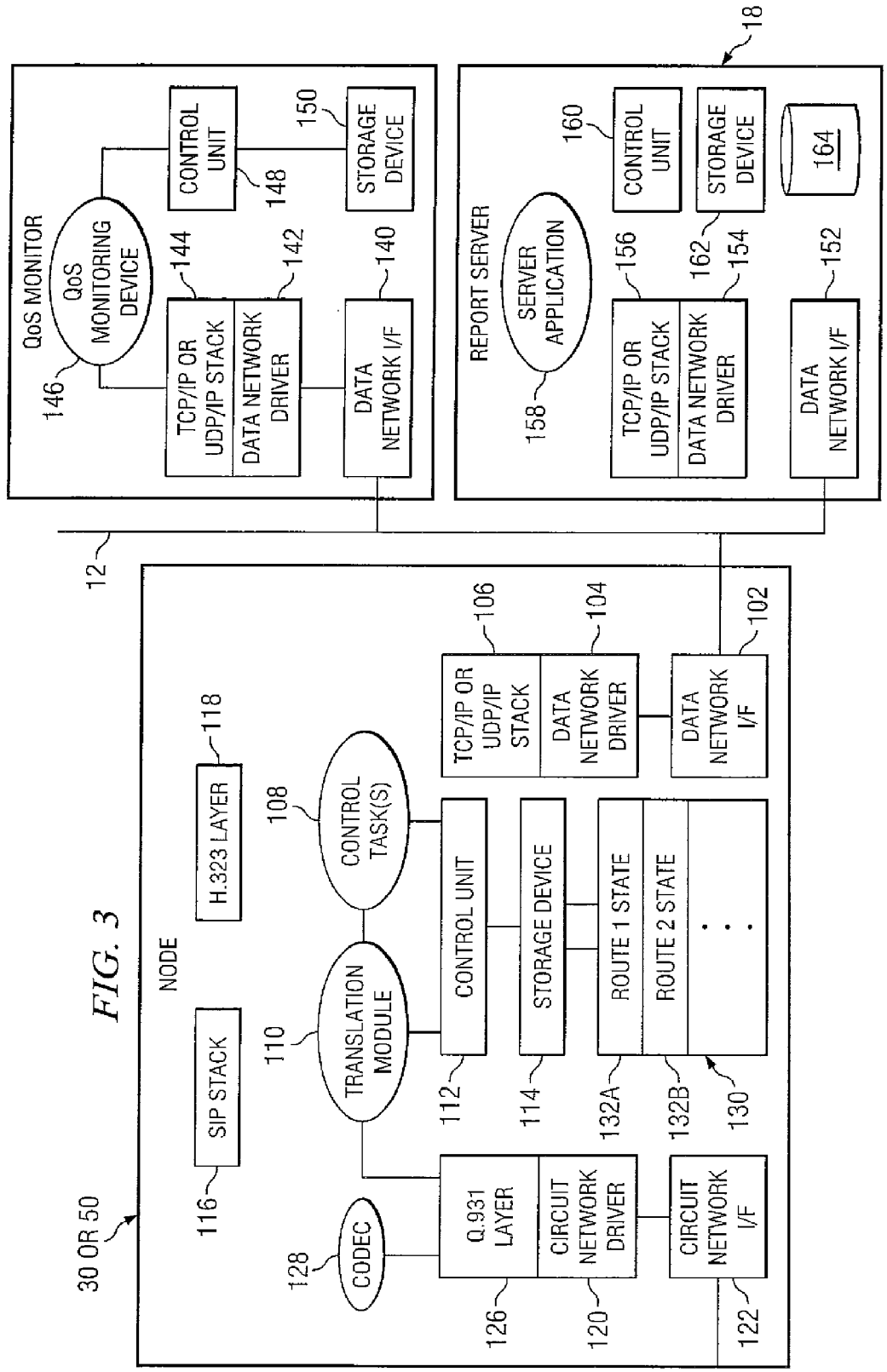
FIG. 3 is a block diagram of a switch, a quality of service (QoS) monitor, and a report server in accordance with one embodiment in the communications system of FIG. 1.

Referring to FIG. 3, components of the node 30 or 50 (the gateway, server, or proxy in host switch 20 or 44), the QoS monitoring device 16, and the report server 18 are illustrated. The node 30 or 50 includes a data network interface 102 that is coupled to the data network 12. As used here, "data network 12" may refer to the collection of the data network 12 and the packet-based trunks 28, 39, 52, and 64. Above the data network interface 102 are various layers, including a data network device driver 104 and a transport and network stack 106. The transport and network stack 106 may include a TCP/IP stack or a UDP/IP stack. TCP is described in RFC 793, entitled "Transmission Control Protocol," dated September 1981; and UDP is described in RFC 768, entitled "User Datagram Protocol," dated August 1980. TCP and UDP are transport layers for managing connections between end points coupled to an IP network.

One or more control tasks 108 may be capable of communicating with the transport and network stack 106 for controlling the receipt of transmission of packets over the data network 12. A translation module 110 may also be present in the node 30 or 50 to translate signaling between telephone exchange system format (e.g., BRI/PRI or SS7) and packet format (e.g., IP, SIP, or H.323). The control tasks 108 and the translation module 110 may be software layers that are capable of being executed on a control unit 112. The control unit 112 may be coupled to a storage device 114.

The node 30 or 50 may also include a SIP stack 116 (for parsing and processing SIP messaging received or to be communicated to the data network 12) or an H.323 layer 118 (for processing H.323 messages received from or to be transmitted to the data network).

The node 30 or 50 may also include a circuit network interface 122 capable of being coupled to an ISDN link (BRI or PRI), SS7 link, or other circuit-switched link. The layers above the circuit network interface 122 include a circuit network device driver 120 and a Q.931 layer 126. The Q.931 layer 126 is the connection control protocol for ISDN, which is roughly comparable to TCP or UDP in the transport and network stack 106. The Q.931 layer 126 manages connection setup and tear down. Another layer may be substituted for the Q.931 layer 126 if the circuit-switched link is an SS7 or other link. Voice data received from, or to be transmitted to, either the link or the data network may pass through an audio coder/decoder (CODEC 128), which may be implemented in a digital signal processor (DSP) or in software executable on the control unit 112.

Each of the gateway, server, or proxy 38 or 60 in the community 14B or 14D in FIG. 1 may be similarly arranged as the node 30 or 50 illustrated in FIG. 3. However, instead of a data network interface and a circuit network interface as in FIG. 3, the gateway, server, or proxy 38 or 60 may include two network interfaces: an interface to a local network (40 or 61) and an interface to the data network 12. Suitable driver, network, and transport layers may be above the network interfaces. The gateway, server, or proxy 38 or 60 may also include a firewall module to protect against unauthorized access to a respective local network (40 or 61 in FIG. 1).

In accordance with some embodiments, a data structure 130 may be stored in the storage device 114 of the node 30 or 50 to indicate the state of various routes in the data network 12. The data structure 130 includes various fields 132 that may indicate quality of service and availability of routes between the community the node 30 or 50 is residing in and other remote communities. Thus, for example, the field 132A represents the state of the packet-based route between a first community and a second community; the next entry 132B represents the state of the route between the first community and a third community; and so forth. The entries 132 of the data structure 130 may be used by the node 30 or 50 to decide whether to route further packets containing streaming data over the routes of the data network 12.

The QoS monitoring device 16 also includes a data network interface 140 that is coupled to the data network 12 as shown in FIG. 3. Above the data network interface 140 are a data network device driver 142 and a transport and network stack 144. A QoS monitoring routine 146, which may be implemented in software, is executable on a control unit 148, which is coupled to a storage device 150.

The report server 18 similarly includes a data network interface 152, a data network device driver 154, and a transport and network stack 156. A server application 158 runs in the report server 18 on a control unit 160, which may be connected to a storage device 162. A database or log 164 may be contained in the storage device 162 to keep track of availability of the various routes through the data network 12 between the different communities 14.

Figure 4:
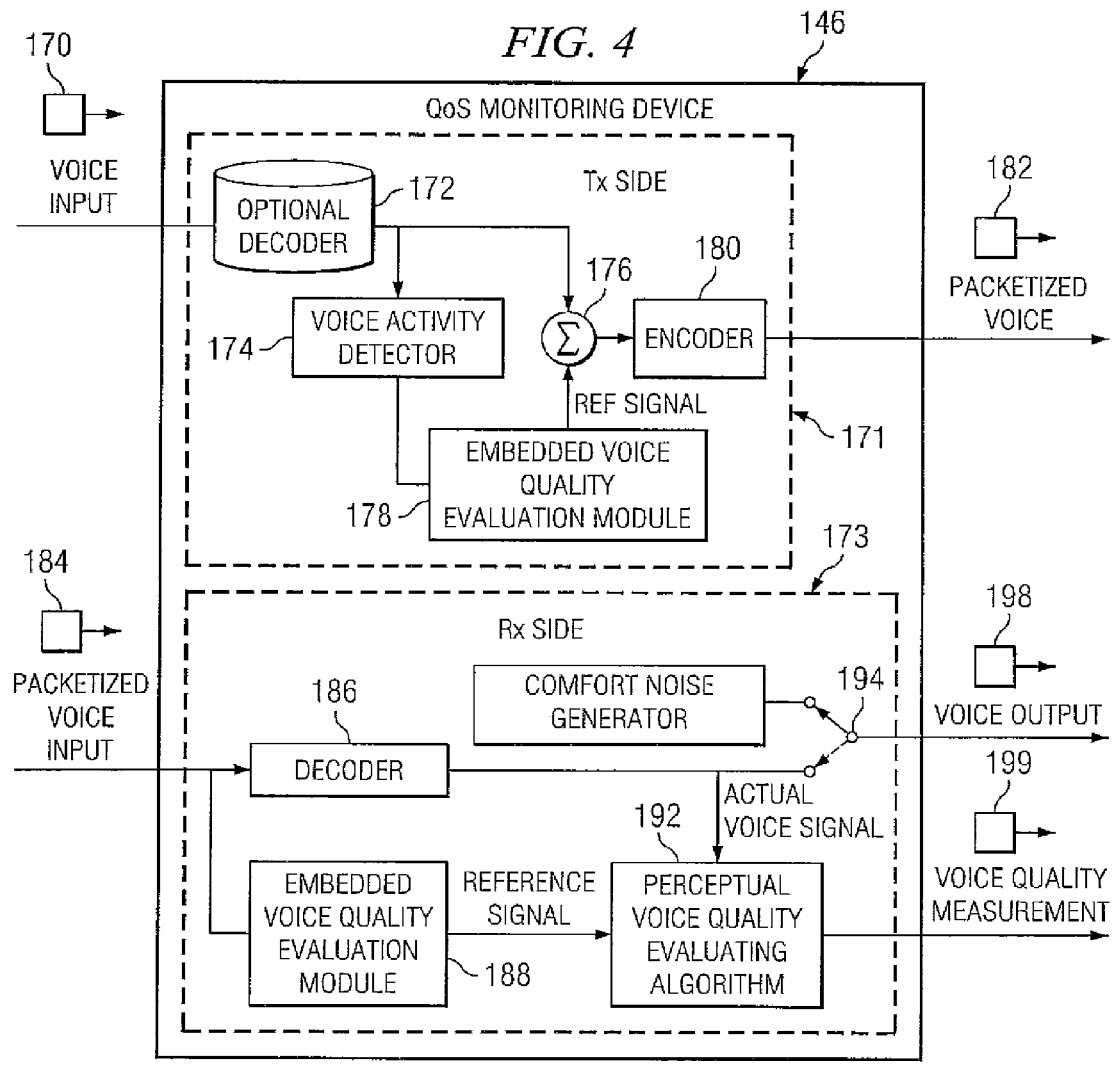
FIG. 4 is a block diagram of a QoS monitoring device in accordance with an embodiment of the quality of service (QoS) monitor of FIG. 3.

Referring to FIG. 4, a block diagram of a QoS monitoring device 146 is shown. QoS monitoring device 146 may have transmitter functionality for sending the reference test packets and may also have receiver functionality for receiving the reference test packets. The transmit module 171 may function independently from the receive module 173. In operation, usually the transmit module 171 of a QoS monitor in a first community (e.g., community 14A of FIG. 1) will send reference test packets to the receive module 173 of a QoS monitor in a second community (e.g., community 14B of FIG. 1). Vice versa, for example, if it is desired to test the voice quality from community 1413 to community 14A, then the transmit module 171 of the QoS monitoring device 146 in community 14B may be used to transmit reference test packets to the receive module 173 of the QoS monitoring device 146 in community 14A. It is to be noted that the QoS monitoring device 146 may include any of the existing feature aspects of the network performance quality measure.

Transmit module 171 may receive a media input signal 170. The media input signal 170 may be packetized. VAD 174 is communicatively coupled to Embedded Voice Quality Evaluation Module (EVQEM) 178. The output from mixer 176 is connected to the input of encoder 180. Encoder 180 encodes the uncompressed signal into a packet 182 for transmission over the packet-based network 182. A flag is also included in packet 182 to indicate the payload type carried by the packet. Upon detecting silence in the input voice at the sending end by VAD 174 and when the EVQEM 178 is enabled to operate, VAD 174 will generate first the silence frames to be sent to the other end (in some embodiments, VAD 174 may be included in the CODEC). Simultaneously, the EVQEVM 178 generates packets containing the reference speech signal to be transmitted to the destination similar to the streaming data that includes the live call speech. A different payload type (PT) may be defined specifically for sending the reference signal packets. The selection of this PT may be made either on static or dynamic basis as described in the RTP protocol RFC 1889. The reference speech signal may consist of one or more segments. Each segment is a stand-alone chunk that can be used by the QoS Monitor 16A to provide a single assessment. Transmission of the reference signal segments continues at any rate defined by the network administrator until real speech is detected by VAD 174. The QoS Monitor 16A may stop transmitting the last segment if not completely transmitted. It will then re-initialize to re-transmit this segment from its beginning once silence is detected again. At the receiving end, the QoS Monitor 16C may discard partial reception of any segment. A delimiter at the beginning and at the end of each segment may be added to indicate that to the receiving end of QoS Monitor 16C.

Receive module 173 may receive a packetized voice input 184. The packetized voice input 184 is input to the decoder 186 and also the Embedded Voice Quality Evaluation Module (EVQEM) 188. EVQEM 188 detects from the payload type flag whether the payload type of the packetized voice input 184 contains actual voice or a reference test signal. If EVQEM 188 detects a reference test signal at the input 184, then the stored reference signal is transmitted from EVQEM 188 to an input of Perceptual Voice Quality Evaluating Algorithm Module (PVQEAM) 192. PVQEAM 192 may operate a quality of speech algorithm as discussed above (e.g., PSQM, PSQM+, PESQ, etc.). Also input into PVQEAM 192 is the actual signal received through the system after being converted into an uncompressed (analog) signal by decoder 186.

PESQ is a means for objectively assessing the quality of speech that has been degraded by a telephony network. PESQ uses a psychoacoustics model that aims to mimic the perception of sound in real life. Simply put, the algorithm functions by comparing the signal after it has been through the coder and decoder process with the original reference signal. PESQ provides a voice quality measurement output signal. If the input and output are identical, the algorithm is designed to produce a perfect score. Similarly, the objective is that if the input and output have inaudible differences the score should not be degraded.

Figure 5:
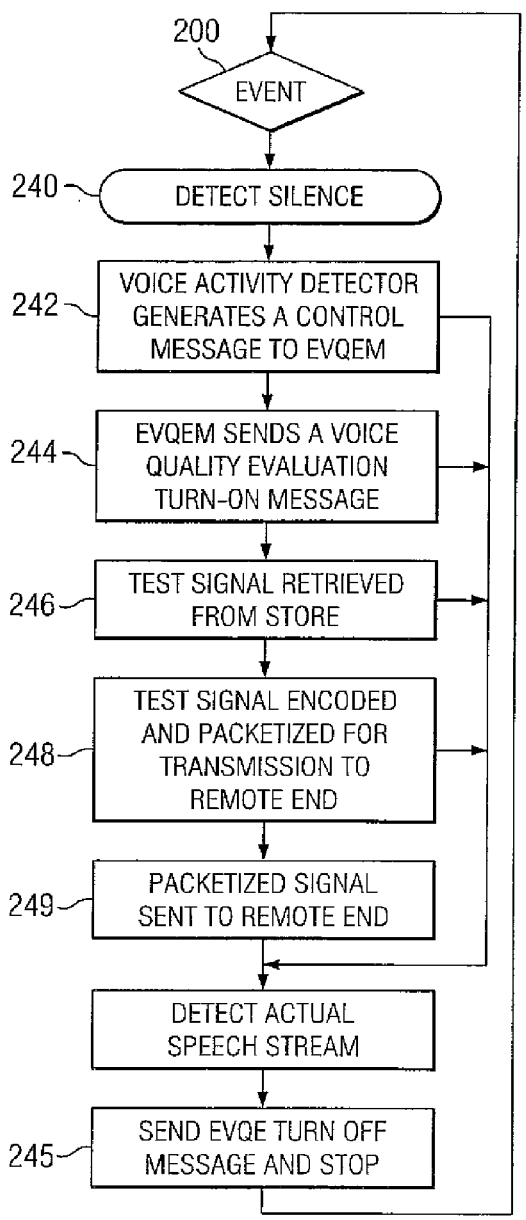
FIG. 5 is a flow diagram of a process performed by the QoS monitoring device of FIG. 3 at the sending side in accordance with an embodiment.

Referring to FIG. 5, a process performed by the QoS monitoring routine 146 is illustrated. The event received (at 200) by the QoS monitoring routine 146 may be the detection of absence of a voice signal, which in turn stimulates the generation and transmission of the reference test packets. Voice Activity Detector (VAD) 174, on detecting the presence or absence of a voice signal (at 240), sends a control signal 175 to EVQEM 178 (at 242). Control signal 175 may indicate whether there is or is not any activity received at the voice input. Accordingly, in the absence of voice activity, EVQEM 178 sends a voice quality evaluation turn-on message (at 244). Next, reference test signal is generated at the output of EVQEM 178 (at 246). Encoder 180 encodes and packetizes the linear signal from the mixer 176 for transmission to the destination over the packet-based network (at 248). Packetized signal is then transmitted to the remote end (at 249). In the event that there is a voice signal received while the reference test signal is being generated, then the EVQEM 178 may send a voice quality evaluation turn-off message and stop generation of the reference signal (at 245). Note that the payload types for voice input (streaming data) and reference signal may be different. Also note that the same CODEC may be used for both payload types.

Figure 6:
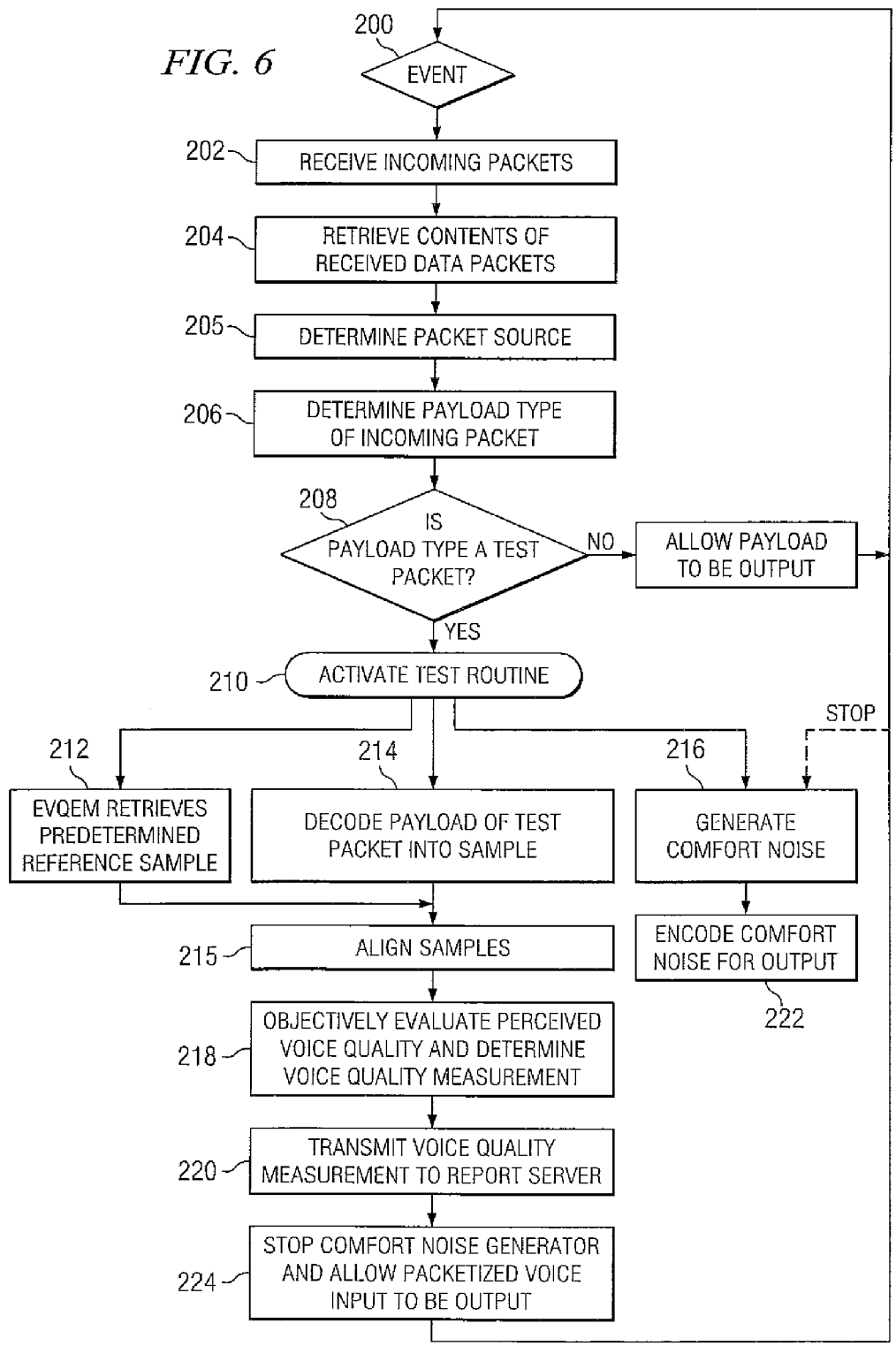
FIG. 6 is a flow diagram of a process performed by the QoS monitoring device of FIG. 3 at the receiving side in accordance with another embodiment.

Referring to FIG. 6, a process performed by the QoS monitoring routine 146 is illustrated. The QoS monitoring routine 146 first determines if an event has been received (at 200). If so, it determines the type of received event. This process may be accompanied by receiving silence frames to generate comfort noise. The possible events may include receipt of incoming packets containing streaming data, an indication to generate test packets carrying a sound sample, silence frames, or an incoming log report.

If the event includes receipt of incoming data packets (at 202), the QoS monitoring routine 146 retrieves (at 204) the contents of the received data packets.

The incoming data packets may contain streaming data communicated during an actual call session, or they may be test packets sent by a remote QoS monitoring device. The source of the incoming packets is determined (at 205). The payload type of the incoming packets may specify the type of data being carried by the packet. The payload type is determined (at 206). If it is determined that the contents of the received incoming data packets carry test packets, the QoS monitoring routine 146 may activate the test routine (at 210). Next, a predetermined reference sample is generated locally (or retrieved from a WAV file, or the like) by EVQEM 188 (at 212). The payloads of the test packets are decoded (at 214) into an uncompressed form by decoder 186, then stored in a WAV file (or the like). Next, the predetermined reference sample is aligned with the received sound sample carried over the network by the test packets (at 215), prior to being input into PVQEAM 192 for evaluation of perceived voice quality (at 218). As discussed above, if the PESQ algorithm is used, the PVQEAM 192 will generate a voice quality measurement output signal 199. Signal 199 is next transmitted to report server (at 220).

While the test routine is being performed, comfort noise is generated (at 216). This is transmitted to the listening devices on the terminals, so that the users do not notice a loss of signal. Comfort noise generator simulates the background noise received when on a call; so that the users don't perceive any insertion of test packet signals. When the test routine is complete, the comfort noise generator is stopped and the packetized voice input 184 is able to be transmitted (at 224).

As discussed above, the QoS perceptual voice quality parameter is determined by using the perceptual voice quality evaluation algorithm Module 192 of the QoS Monitor 16. Examples of other QoS parameters that may also be measured include end-to-end delay (or latency), round-trip delay, packet loss, and jitter. The end-to-end delay is a measurement of the time for a given packet to pass between two points in a network. Factors that affect end-to-end delay include, for example, the type and number of switches or routers, distance traveled, network congestion, network bandwidth, and amount of retransmission. Round trip delay is a measurement of the time for a given packet to travel from a first end to another end and back to the first end again. Packet loss is related to the number of packets that become dropped because of insufficient network resources.

Jitter refers to the variations in time for packets to arrive at a destination point. A first packet (transmitted earlier in time) may arrive at the destination after a later packet due to variations in the delay experienced by the two packets. To accommodate this packet-to-packet variation (or jitter), a jitter buffer may be used at the receiving end to collect packets. The jitter buffer allows a receiving system to wait until packets in a desired sequence have all arrived.

Thus sizes of jitter buffers affect the packet delay and packet loss rate experienced in a network. A larger jitter buffer reduces the likelihood of packet loss due to jitter since more packets can be collected in the larger jitter buffer. However, a larger jitter buffer comes at the expense of increased delay. Packet loss rate may also be based on overrun or underrun of a decoder in the audio CODEC. Underrun occurs when packets arrive slower than the ability of the decoder to process them. Overrun occurs when packets arrive faster than the decoder is able to handle, resulting in overwriting of previously received packets and consequently loss of data.

Thresholds may be set for each of the QoS parameters (e.g., perceptual voice quality, delay, packet loss rate, and jitter). Violations of such thresholds may lead to the conclusion that the data network 12 has become unavailable or unreliable.

Average perceived voice quality may be calculated using statistics gathered from the report server of the receiving system. For example, the statistics may include the maximum and minimum perceived voice quality, the times associated with those measurements, the nodes through which the data path was routed, and so on.

Average packet delay may be calculated using statistics gathered from the jitter buffer of the receiving system. In one example, the statistics may include the minimum packet holding time in the jitter buffer, the maximum packet holding time in the jitter buffer, and the peak holding time in the jitter buffer. Decoder overrun/underrun may also be used to determine the average packet delay. By accumulating these statistics over time, the QoS monitoring routine 146 can calculate an average perceived voice quality value and an average packet delay value through the data network 12.

Lost packet counts may be maintained by accumulated packet header information and audio decoder statistics, including audio decoder underun, audio decoder overrun, out of sequence packet reception, and time stamp values in the packet headers. By accumulating the statistics over time, an accurate lost packet rate may be derived.

In addition to the above techniques, test packets containing simulated streaming data may be employed to derive the QoS parameters. In the creation of test packets, time stamp (containing the current time) and sequence number information may be added to the test packets. To simulate voice communications, test packets are not sent as a continuous stream but rather are sent in short bursts amid the streaming communications for the actual voice communications. Both ends can monitor the time stamp information and sequence number information to determine perceived voice quality, average end-to-end delay, average round-trip delay, average packet-to-packet jitter, and average packet loss.

Figure 7:
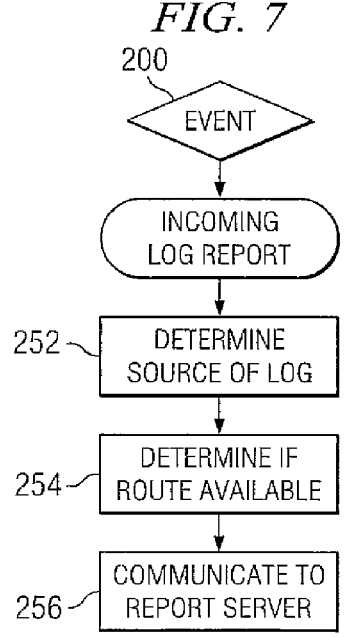
FIG. 7 is a flow diagram of a process performed by the QoS monitoring device of FIG. 3 in accordance with another embodiment.

Referring to FIG. 7, a process performed by the QoS monitoring routine 146 is illustrated. The incoming event received at 200 by the QoS monitoring routine 146 may also be a log report that is communicated by a remote QoS monitoring device 16. The QoS monitoring routine 146 first determines (at 252) the source of the log report. The QoS monitoring routine 146 then reviews the content of the log report to determine (at 254) if a particular route to a remote community is available or not. In either case, the results of the review may be communicated (at 256) to the report server 18.

Figure 8:
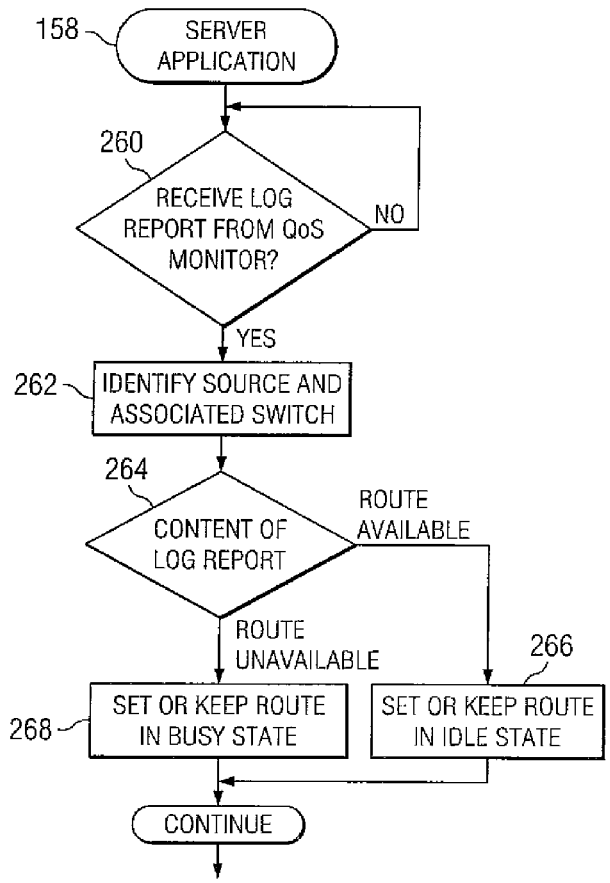
FIG. 8 is a flow diagram of a process performed by the report server of FIG. 3 in accordance with an embodiment.

Referring to FIG. 8, the process performed by a server application 158 in the report server 18 (FIG. 2) is illustrated. The server application 158 waits for receipt (at 260) of a log report from a QoS monitoring device 16. The server application 158 then identifies (at 262) which QoS monitoring device 16 sent the log report. The server application then determines the switch associated with the QoS monitoring device that sent the log report. The server application 158 may perform this by issuing a Simple Network Management Protocol (SNMP) query to the QoS monitoring device 16. In response to the SNMP query, the QoS monitoring device 16 returns an identifier of the switch that the QoS monitoring device 16 is associated with. Other mechanisms for communicating the identity of the switch associated with the QoS monitoring device 16 may also be used. The switch may be one of the host switches 20, 44, and the gateways, servers, or proxies 38, 60.

The server application 158 next determines (at 264), from the content of the log report, whether a route through the data network 12 to or from the identified switch is available. The route may be one of routes 70 in FIG. 2. If the route is available, the server application 158 sends (at 266) an indication (which may also be an SNMP query) to the switch to set or keep the route at an idle (or available) state. If the QoS parameters in the log report indicate that the route is not available, then the server application 158 sends (at 268) an indication to set or keep the route at busy state, such as a Remote Maintenance Busy (RMB) state.

Figure 9:
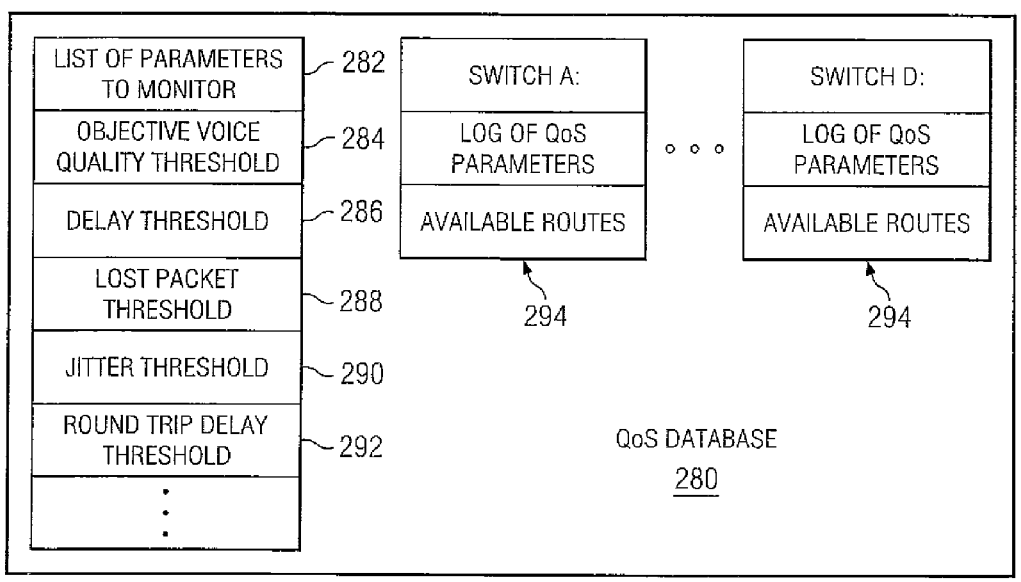
FIG. 9 illustrates data structures containing QoS parameters stored in the report server of FIG. 3 in accordance with an embodiment.

Referring to FIG. 9, the contents of the QoS database 280 in the log server 18 in accordance with one example embodiment is illustrated. The QoS database 280 includes a table 282 listing QoS parameters that are being monitored and their corresponding thresholds. For example, the list 282 may include an entry 284 for the objective voice quality threshold, an entry 286 for the end-to-end delay threshold, an entry 288 for the lost packet rate threshold, an entry 290 to store the jitter threshold, an entry 292 to store the round trip delay threshold, and other entries to store thresholds of other QoS parameters. When the server application 158 receives a log report of QoS parameters from a QoS monitoring device, the server application 158 compares the QoS parameters in the log report with the list 282. Based on such a comparison, the server application 158 can determine if certain routes through the data network 12 are available or not. The results of such comparisons may be maintained in logs 294, each associated with a corresponding switch.

A system is described for determining quality levels of routes in a packet-based data network between different switches. The system includes QoS monitoring devices associated with switches in corresponding communities. Each QoS monitoring device is capable of receiving packets containing streaming and test data and deriving QoS parameters based on the received packets. The packets may include streaming data communicated as part of a call session, wherein the test packets are transmitted over the streaming data path, in times when both users are not speaking, thereby using the streaming data path to carry the test packets during silent moments. Test packets may be exchanged between different paths of QoS monitoring devices. The derived QoS parameters are reported to a report server, which can then determine if certain trunk routes in the data network are unavailable or unsuitable to provide adequate quality of service. if a trunk route is unavailable, the report server may program the appropriate switches to the desired state.

As discussed above, the use of the QoS monitoring module to objectively assess in real-time the quality of speech that has been degraded by a data network is not limited to packet data networks, and can be used effectively to test, for example, wireless systems and cable TV systems that carry speech and/or video.

As discussed above, the various network elements coupled to the data network 12 include various software layers, routines, or modules. Such software layers, routines, or modules are executable on corresponding control units. The various control units in the network elements may each include a microprocessor, a microcontroller, a processor card (including one or more microprocessors or controllers), or other control or computing devices. The storage devices referred to in this discussion may include one or more machine-readable storage media for storing data and instructions. The storage media may include different forms of memory including semiconductor memory devices such as dynamic or static random access memories (DRAMs or SRAMs), erasable and programmable read-only memories (EPROMs), electrically erasable and programmable read-only memories (EEPROMs) and flash memories; magnetic disks such as fixed, floppy and removable disks; other magnetic media including tape; and optical media such as compact disks (CDs) or digital video disks (DVDs). Instructions that make up the various software routines, modules, or layers in the various network elements may be stored in respective storage devices. The instructions when executed by a respective control unit cause the corresponding network element to perform programmed acts.

The instructions of the software routines, modules, or layers may be loaded or transported to the network element in one of many different ways. For example, code segments including instructions stored on floppy disks, CD or DVD media, a hard disk, or transported through a network interface card, modem, or other interface device may be loaded into the system and executed as corresponding software routines, modules, or layers. In the loading or transport process, data signals that are embodied in carrier waves (transmitted over telephone lines, network lines, wireless links, cables, and the like) may communicate the code segments, including instructions, to the network element. Such carrier waves may be in the form of electrical, optical, acoustical, electromagnetic, or other types of signals.

While the invention has been disclosed with respect to a limited number of embodiments, those skilled in the art will appreciate numerous modifications and variations therefrom. It is intended that the appended claims cover all such modifications and variations as fall within the true spirit and scope of the invention.

What is claimed is:

1. A method of determining a quality of service parameter of a packet-based network, comprising:
    receiving incoming test packets among streaming data traffic packets over the packet-based network during a session;
    detecting whether received incoming data packets are test packets, comprising: detecting a start of test signal message; and
    when the received incoming data packets are test packets:
        deriving a test signal from plural received test packets; and
        comparing the derived test signal to a reference test signal to determine the quality of service parameter.

2. The method in accordance with claim 1, wherein the test signal and the reference test signal are speech signals.

3. The method in accordance with claim 1, wherein the step of deriving a test signal from plural received packets comprises decoding the plural received packets to derive the test signal.

4. method in accordance with claim 1, further comprising aligning the derived test signal and the reference test signal before comparing the derived test signal to the reference test signal.

5. The method in accordance with claim 1, further comprising retrieving the reference test signal from a storage device.

6. The method in accordance with claim 1, wherein the step of detecting whether received incoming data packets are test packets comprises detecting an end of test signal message.

7. The method in accordance with claim 1, further comprising controlling operation of the packet-based network responsive to the determined quality of service parameter.

8. A method of determining a quality of service parameter of a packet-based network, comprising:
    receiving incoming streaming data during a session;
    checking the incoming streaming data for activity; and
    on determining a period of inactivity in the incoming streaming data, transmitting outgoing streaming data during the session, the outgoing steaming data comprising a plurality of test packets from which a test signal can be derived and a start of test signal message indicative of a test signal transmission.

9. The method in accordance with claim 8, wherein the test signal is a speech signal.

10. A system for determining a quality of service parameter of a packet-based network, comprising:
    an interface to the packet-based network configured to receive incoming test packets among streaming data traffic packets over the packet-based network during a session; and
    a processor configured to detect whether received incoming data packets are test packets and configured to detect a start of test signal message and, when the received incoming data packets are test packets to derive a test signal from plural received test packets and to compare the derived test signal to a reference test signal to determine the quality of service parameter.

11. The system in accordance with claim 10, wherein the test signal and the reference test signal are speech signals.

12. The system in accordance with claim 10, wherein the processor is configured to decode the plural received packets to derive the test signal.

13. The system in accordance with claim 10, wherein the processor is configured to align the derived test signal and the reference test signal before comparing the derived test signal to the reference test signal.

14. A system for determining a quality of service parameter of a packet-based network, comprising:
    an interface to the packet-based network configured to receive incoming streaming data during a session; and
    a processor configured to check the incoming streaming data for activity and, on determining a period of inactivity in the incoming streaming data, to transmit outgoing streaming data during the session, the outgoing steaming data comprising a plurality of test packets from which a test signal can be derived and a start of test signal message indicative of a test signal transmission.

15. The system in accordance with claim 14, wherein the test signal is a speech signal.

16. A non-transitory computer readable medium including computer executable instructions for determining a quality of service level of a packet-based network, the instructions comprising instructions for:
    receiving incoming test packets among streaming data traffic packets over the packet-based network during a session;
    detecting whether received incoming data packets are test packets and detecting a start of test signal message; and
    when the received incoming data packets are test packets:
        deriving a test signal from plural received test packets; and
        comparing the derived test signal to a reference test signal to determine the quality of service parameter.

17. The non-transitory computer readable medium in accordance with claim 16, wherein the test signal and the reference test signal are speech signals.

18. A non-transitory computer readable medium including computer executable instructions for determining a quality of service level of a packet-based network, the instructions comprising instructions for:
- receiving incoming streaming data during a session;
- checking the incoming streaming data for activity; and
- on determining a period of inactivity in the incoming streaming data, transmitting outgoing streaming data during the session, the outgoing steaming data comprising a plurality of test packets from which a test signal can be derived and a start of test signal message indicative of a test signal transmission.

19. The non-transitory computer readable medium in accordance with claim 18, wherein the test signal is a speech signal.

* * * * *